United States Patent
Bremnes

(10) Patent No.: US 6,341,920 B1
(45) Date of Patent: Jan. 29, 2002

(54) SYSTEM FOR COLLECTING OIL ON WATER

(75) Inventor: Asbjorn S. Bremnes, Flatholmveien 34, N-4056 Tananger (NO)

(73) Assignees: Asbjorn S. Bremnes, Tananger; Amoco Norway Oil Company, Stavanger, both of (NO)

( * ) Notice: Subject to any disclaimer, the term of this patent is extended or adjusted under 35 U.S.C. 154(b) by 0 days.

(21) Appl. No.: 09/582,148

(22) PCT Filed: Dec. 11, 1999

(86) PCT No.: PCT/NO98/00377

§ 371 Date: Sep. 11, 2000

§ 102(e) Date: Sep. 11, 2000

(87) PCT Pub. No.: WO99/35340

PCT Pub. Date: Jul. 15, 1999

(30) Foreign Application Priority Data

Dec. 22, 1997 (NO) .......................................... 19976046

(51) Int. Cl.⁷ .............................................. E02B 15/04
(52) U.S. Cl. ..................... 405/63; 405/72; 210/242.3; 210/923; 210/922
(58) Field of Search ............................ 405/60, 63, 64, 405/66, 68, 72, 96; 210/153, 922, 923, 924, 242.1, 24.3, 242.4

(56) References Cited

U.S. PATENT DOCUMENTS

| | | | | |
|---|---|---|---|---|
| 3,998,060 A | * | 12/1976 | Preus ........................... | 405/72 |
| 4,059,962 A | * | 11/1977 | Milgram ....................... | 405/72 |
| 4,073,143 A | * | 2/1978 | Preus ........................... | 405/72 |
| 4,211,659 A | | 7/1980 | Nyfeldt et al. | |
| 4,388,188 A | * | 6/1983 | Morris .......................... | 405/72 |
| 4,693,200 A | * | 9/1987 | Noble ........................... | 405/68 |
| 4,935,152 A | * | 6/1990 | Gonzales ...................... | 405/68 |
| 5,035,536 A | * | 7/1991 | von Winckelmann ........ | 405/60 |
| 5,071,545 A | * | 12/1991 | Ashtary ........................ | 405/66 |
| 5,139,363 A | * | 8/1992 | Jenkins ......................... | 405/63 |
| 5,149,226 A | * | 9/1992 | Antinoro et al. ............. | 405/63 |
| 5,387,055 A | * | 2/1995 | Jenkins ......................... | 405/63 |
| 5,491,922 A | * | 2/1996 | Sanders ........................ | 405/63 |
| 5,810,512 A | * | 9/1998 | Kateley ........................ | 405/64 |

FOREIGN PATENT DOCUMENTS

| | | |
|---|---|---|
| DE | 29 36 151 A1 | 3/1981 |
| DE | 30 06 360 A1 | 8/1981 |
| DK | 148925 B | 11/1985 |
| FR | 2061978 | 6/1971 |

* cited by examiner

*Primary Examiner*—Thomas B. Will
*Assistant Examiner*—Alexandra K. Pechhold
(74) *Attorney, Agent, or Firm*—Frommer Lawrence & Haug LLP; William S. Frommer; Matthew K. Ryan

(57) ABSTRACT

A system for collecting oil on water comprises an oil boom (1) and a floating collection container (2), which is connected to an opening (4) in the boom by a pumping hose (3). The pumping hose (3) is flexible so that it can follow the wave motions of the water and is provided with non-return valves, making the flow (18) in the pumping hose unidirectional. The distance between the opening (4) in the boom and the collection container (2) is adjustable by tension members (8) in order for the excess length or slack in the pumping hose (3) to be adjusted to the prevailing wave height or length conditions.

20 Claims, 5 Drawing Sheets

SYSTEM FOR COLLECTING OIL ON WATER

BACKGROUND OF THE INVENTION

In connection with oil spill protection operations where one has tried to use traditional oil booms and skimmers in order to collect oil from the sea surface, it has proven difficult to keep the oil in the oil boom long enough for the skimmer to transfer it to a tanker or the like. The reason is that if the relative velocity between the boom and the water exceeds about 1 knot, the oil has a tendency to escape below the boom. This situation is aggravated in waves, and even the best of the existing oil booms will in reality have problems in keeping the oil contained in wave heights above 3 meters.

DESCRIPTION OF THE PRIOR ART

In order to alleviate these problems, an oil collecting system has previously been suggested in DE-A-2936151 where one can transfer the oil continuously from the boom to a floating, generally closed separation container which is towed behind the boom and is connected to an opening at the bight of the boom by means of a tubular member. The separation container is in the bottom provided with one or more openings so that water can escape, and the container is sufficiently large for any mixture of oil and water to have sufficient retention time to undergo a gravity separation. As the container is filled with oil, it may be emptied over into a trailing collection container.

A disadvantage in the system according to DE-A-2936151 is that the towing forces of the separation and collection containers are transmitted directly to the oil boom via the tubular member. These forces have an impeding effect on the ability of the oil boom to follow the motions of the sea. Furthermore, motor driven propellers are arranged both in the tubular member and in the connection between the separation and collection containers in order to provide transportation of the water and oil. These propellers will cause a strong stirring and mixing of the oil and water that will complicate the desired separation of these liquids.

In order to avoid or reduce these problems, it is suggested according to the invention to modify the previously suggested system in such a way that the tubular member will function as a pump under the influence of the wave motion of the water.

SUMMARY OF THE INVENTION

This is obtained according to the invention by forming the tubular member in a flexible manner so that it will be able to follow the wave motion of the water and thereby act as a pump, for instance by it being provided internally with means restricting the flow therein from the boom towards the collection container. Such means can be non-return valves of different shapes, so that a kind of peristaltic effect is obtained.

In order for the tubular member, in the following also called the pumping hose, to be able to follow the motions of the sea as efficiently as possible, it is suggested according to the invention to transmit the necessary towing forces to the collection container by means of separate tension members. The tension members can be run from the collection container to e.g. a point on the boom spaced from its opening, or directly to a towing vessel.

The length of the tension members is preferably adjustable, i.a. in order to make the excess length or the slack in the pumping hose variable for the adjustment to the prevailing wave conditions, i.e. the length and height of the waves.

The expected wave length will also influence the length of the pumping hose, this length being preferably at least one half of the wave length of the longest waves to be expected to some extent.

BRIEF DESCRIPTION OF THE DRAWINGS

For a better understanding of the invention it will be described more closely with reference to the exemplifying embodiments schematically shown in the appended drawings, where.

DETAILED DESCRIPTION OF THE PREFERRED EMBODIMENT

Figure 1:
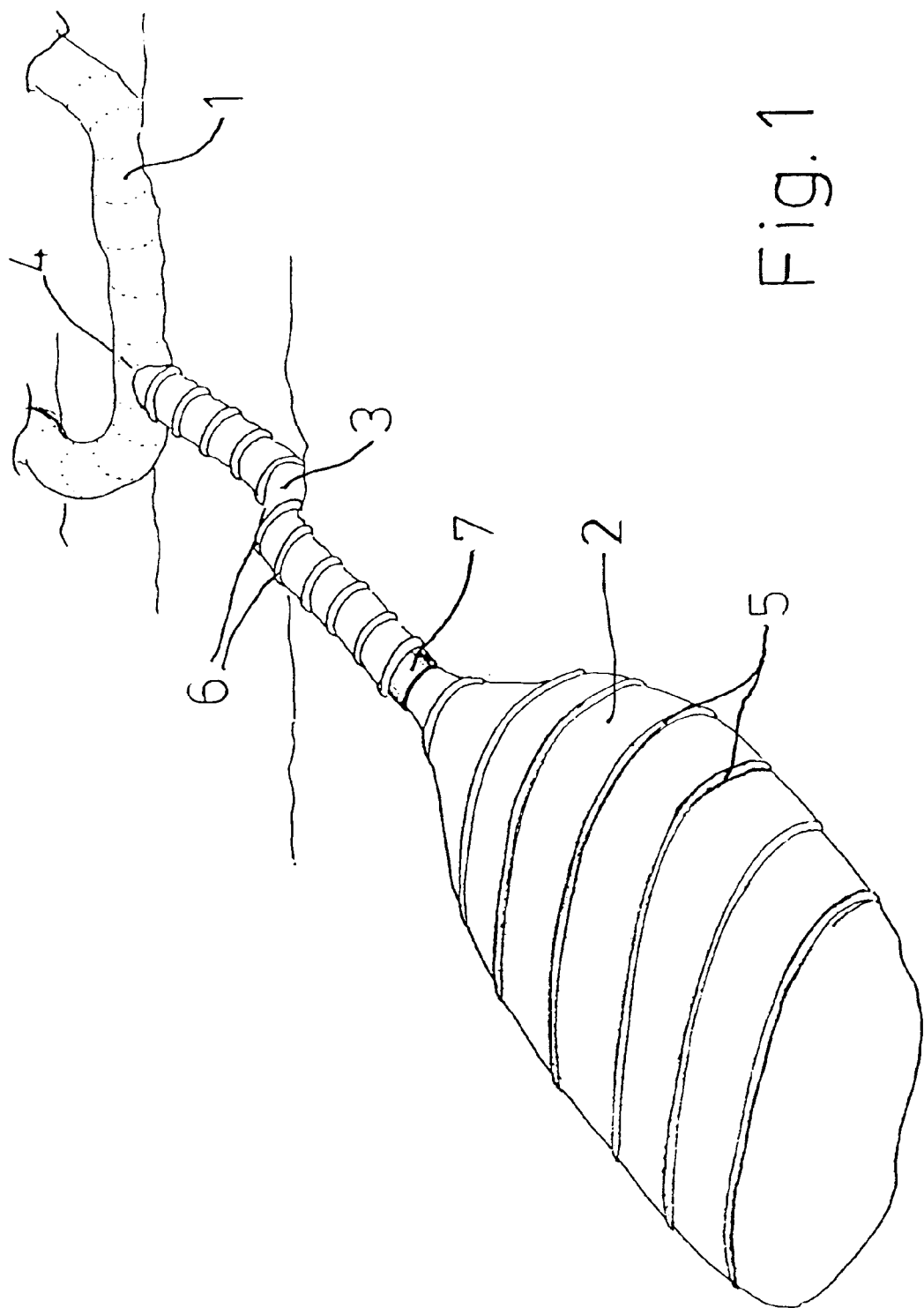
FIG. 1 is a perspective view showing schematically parts of the main elements comprised by the system according to the invention in floating condition.

The system according to the invention illustrated in FIG. 1 comprises an oil boom 1, a floating collection container 2 and a generally tubular member 3 connecting the oil boom 1 and the collection container 2. The oil boom has an opening 4 (not visible) where the tubular member 3 is connected, so that a flow communication is formed between the bight of the boom and the collection container.

Both the collection container 2 and the tubular member 3 are provided with stiffening ribs 5 and 6, respectively, which e.g. can have the form of inflatable rings concurrently serving as buoyancy bodies. The tubular member 3, which also is called a pumping hose, is connected to the collection container 2 by means of a quick release coupling 7, e.g. in the form of a muff coupling, where one of the two mutually overlapping elements is generally rigid and the other is flexible, the flexible element being clamped on the rigid element by means of a tightening device, e.g. in the form of an inflatable ring.

Tension members, e.g. in the form of ropes or wires, will extend between the coupling 7 and the boom 1 and/or a towing vessel. These members are not shown in FIG. 1, but are exemplified in FIGS. 2–4. Both the collection container 2 and the pumping hose 3 may be made of flexible material, e.g. a plastic covered textile, their shape being maintained by means of the ribs 5,6. The bottom of the collection container may be provided with one or more closeable openings in order for water to escape during the collecting operation, and the container may further be provided with a hose connection (not shown) at the end in order to permit the suction of oil from the container while it is in use.

Figure 2:
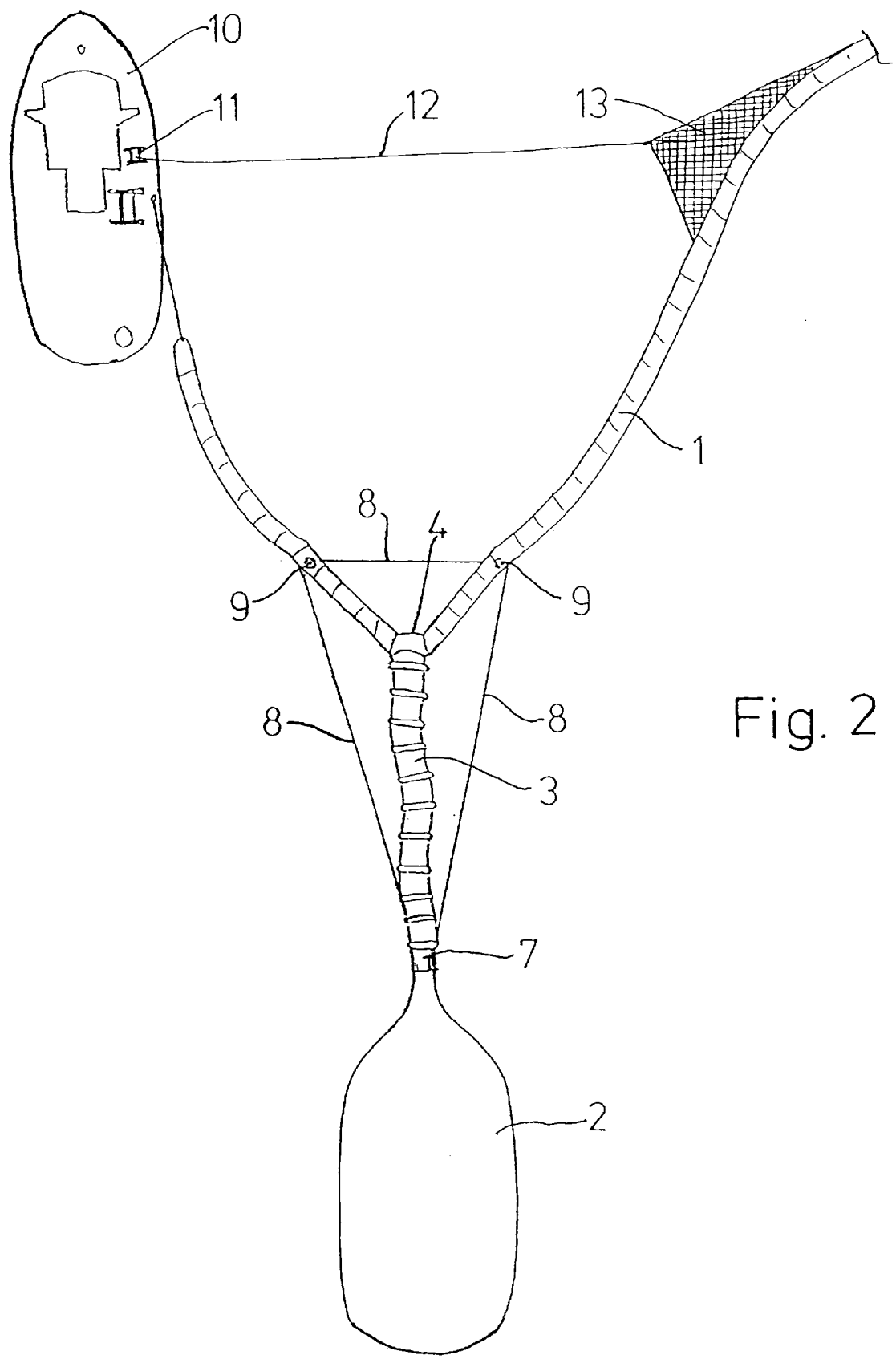
FIG. 2 shows schematically a plan view of a first embodiment of the invention while in use.
Figure 3:
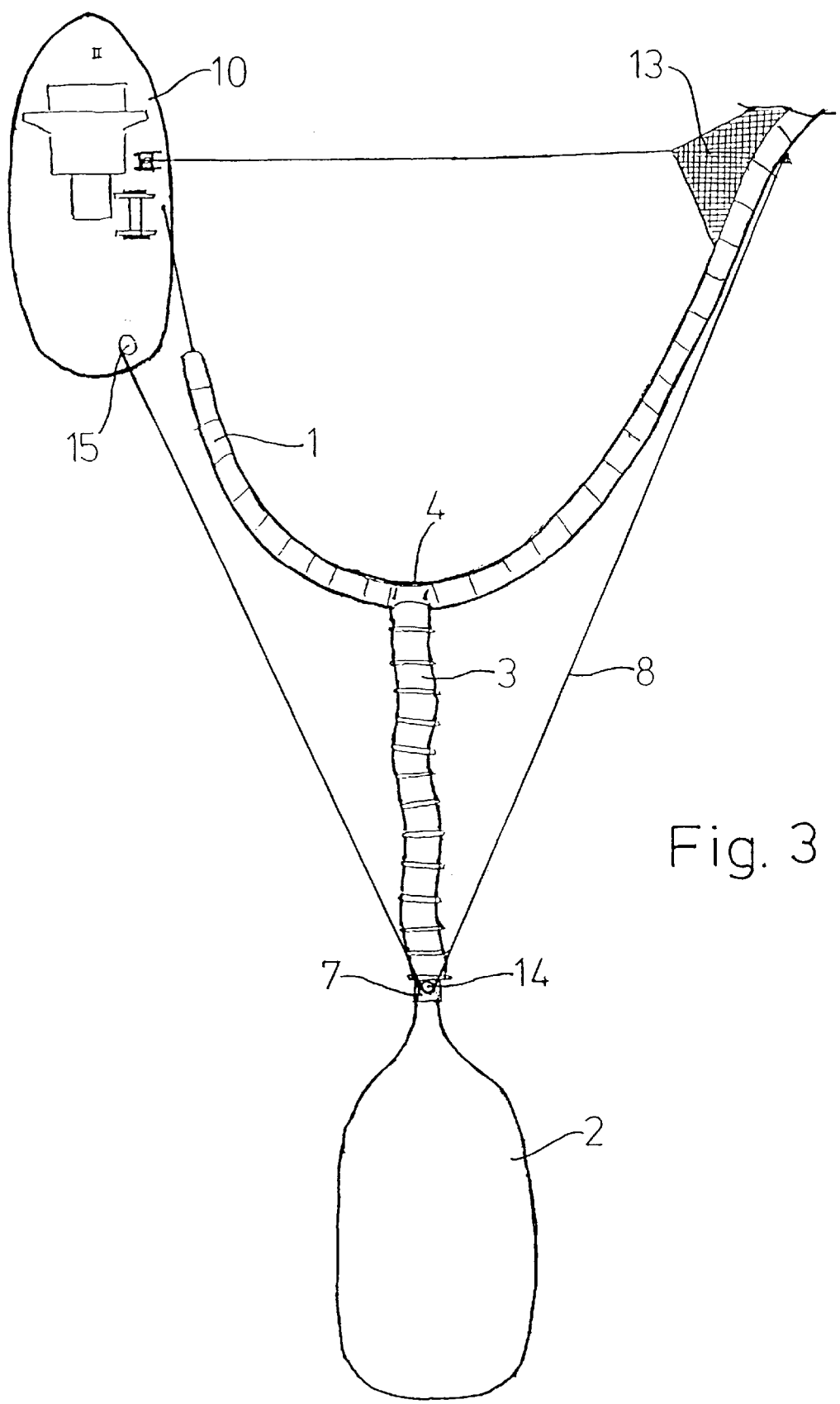
FIG. 3 shows a view similar to that of FIG. 2 of a second embodiment of the invention.
Figure 4:
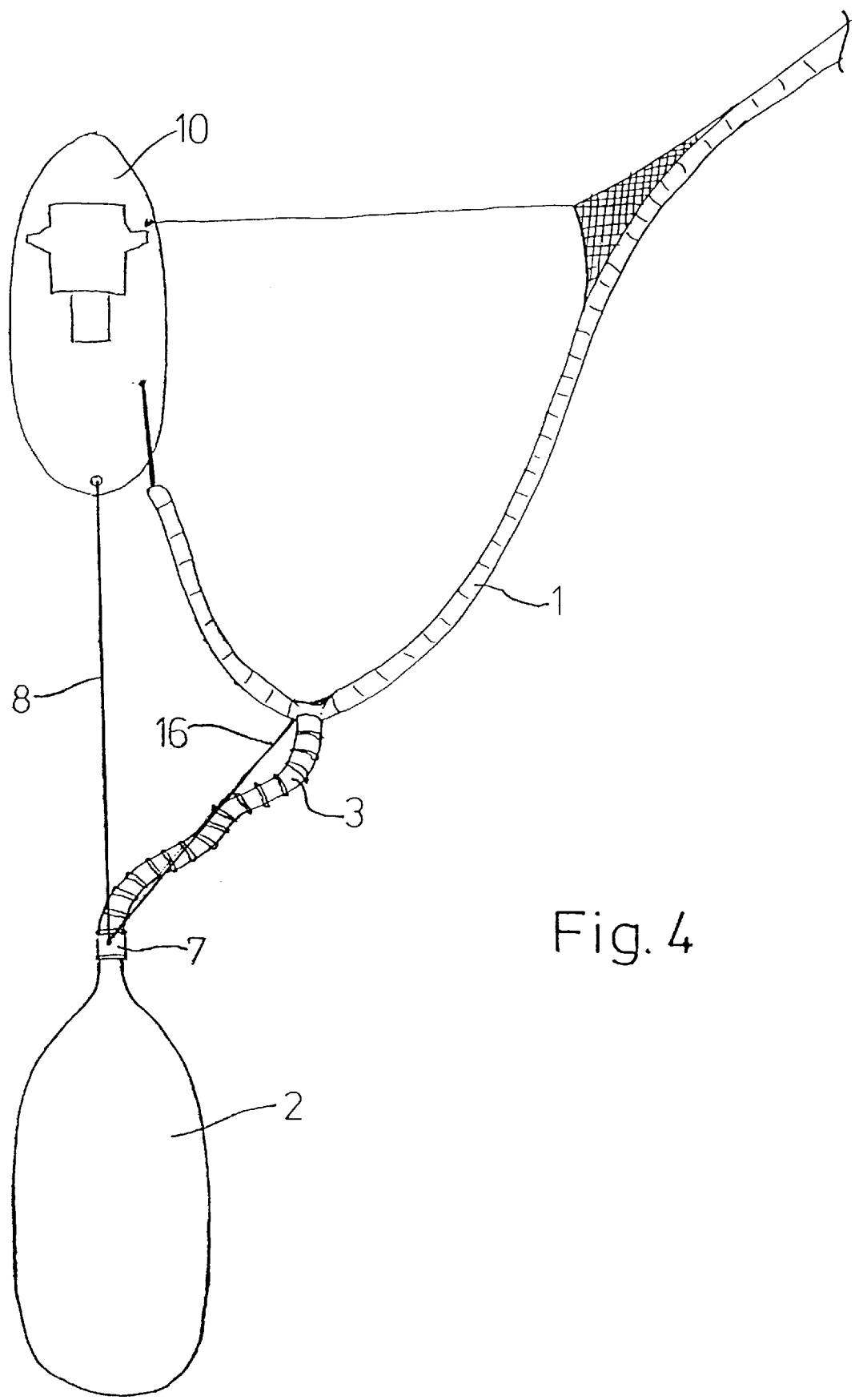
FIG. 4 shows a view similar to FIG. 2 of a third embodiment of the invention.

It is also referred to FIGS. 2–4, where three different towing configurations for the system according to the invention are illustrated. Here, similar elements are designated by the same reference numerals.

FIG. 2 shows the oil boom 1, the collection container 2 and the pumping hose 3, generally in accordance with FIG. 1. In addition, the figure shows a tension member 8 running from the coupling via two attachment points 9 on the boom and back to the coupling 7. The attachment points may have the form of snatch blocks through which the tension member is running in order to provide some control of the geometry of the boom. However, the tension member 8 may be provided with stoppers that will abut against the snatch blocks if the boom should try to assume an undesirable geometry. The snatch blocks 9 may be attached to the tension relieving member of the boom, usually being a chain.

FIG. 2 furthermore shows a towing vessel 10 towing the left part of the boom 1. The right part of the boom is also connected to a vessel (not shown) in a manner known per se. From a winch 11 on the towing vessel 10 a rope 12 extends transversally over to the right part of the boom 1, the rope being attached to the boom by means of a netting crowfoot 13 which distributes the tension from the rope 12 to a larger portion of the boom. By means of the winch 11 the boom bight may be varied, e.g. in relation to the towing velocity.

It will be noted that the length of the tension member is adjusted so that the pumping hose 3 has an excess length so that it can assume a wavy shape and thus follow the wave motions of the water without appreciable tension occurring therein.

FIG. 3 shows an embodiment where the tension member 8 at one end is attached to the right part of the boom at the netting crowfoot 13. The tension member runs over a pulley, e.g. in the form of a snatch block 14, and from there to a winch 15 on the towing vessel 10. By means of the winch 15 the length of the tension member 8, may be varied, thereby varying the slack or excess length of the pumping hose 3. This makes it possible to adjust the length of the pumping hose to the prevailing wave conditions, i.e. the height and length of the waves.

In the embodiment in FIG. 3 there may also be arranged safety lines (not shown) between the coupling 7 and the boom near the opening 4. Such safety lines must be shorter than the pumping hose 3 and will become functional if one, by extending the tension member 8, should wish to make the bight of the boom more pointed, for instance for quickening the flow of oil towards the opening 4.

FIG. 4 shows an embodiment where the towing force for the collection container 2 is transmitted directly to the towing vessel 10. In this case a safety line 16 is used to prevent the boom bight from being pulled so far from the container 2 that the pumping hose 3 will not retain the necessary freedom of movement.

Figure 5:
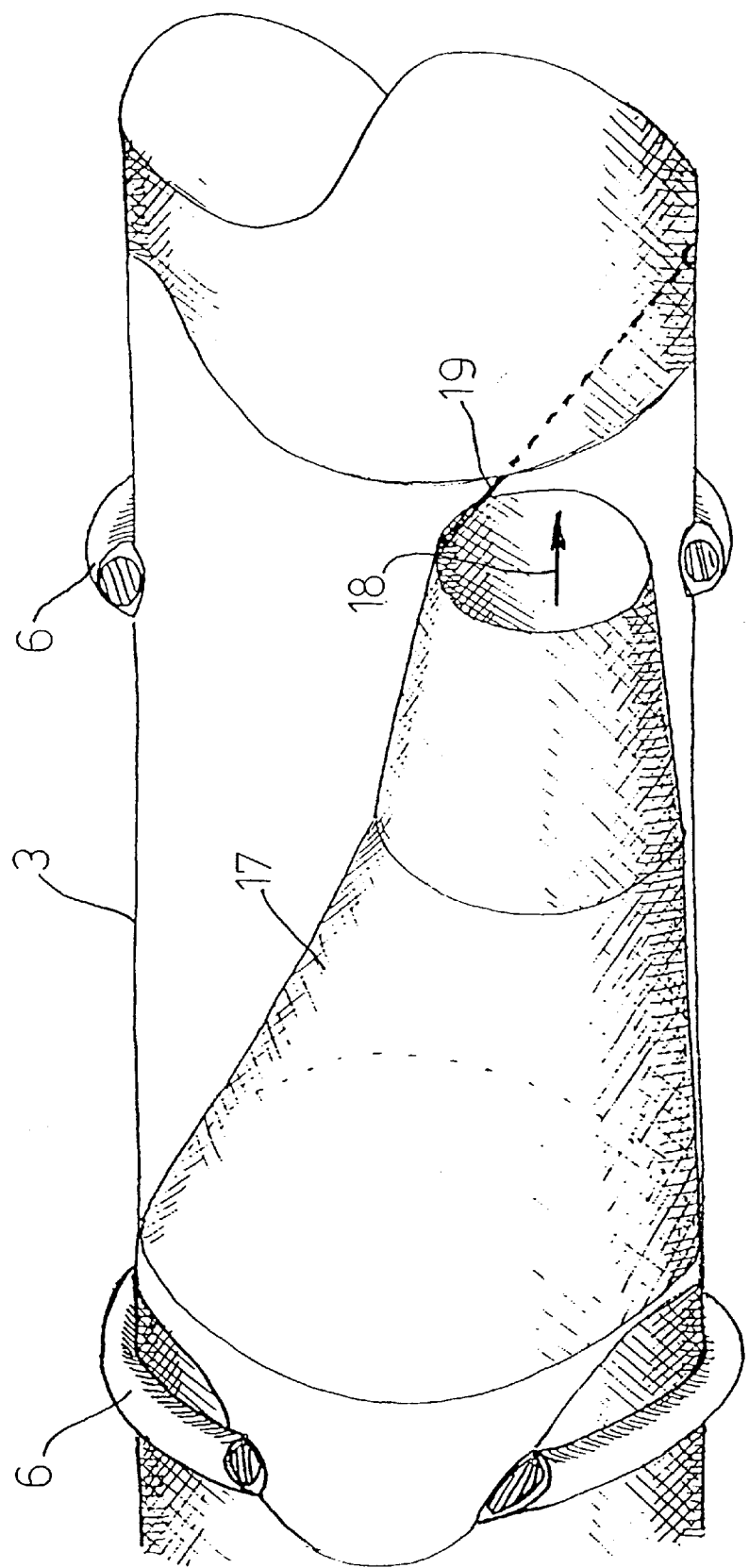
FIG. 5 shows schematically, partly in section, a portion of a pumping hose according to the invention.

As mentioned previously, the pumping hose 3 may have different designs and for instance be provided with internal non-return valves. A possible design of such a non-return valve is schematically suggested in FIG. 5. Here, the valve 17 has the shape of a funnel of flexible material, e.g. a fabric material, which will permit flow in the direction of the arrow 18, but will collapse and close if the flow should try to move in the opposite direction. In order to prevent the funnel from folding back on itself during flow in the wrong direction, the pointed end of the funnel is connected to a tension member 19 attached to a suitable point on the inside of the pumping hose.

Also other forms of non-return valves can advantageously be used in the pumping hose 3 according to the invention. For instance, double flap valves may be used, preferably such valves that have integrally cast semi-circular flaps hinged along a common diameter by means of film hinges cast integrally with the valve flaps. Such valves will open and close at very low pressure differences and will, due to their simple structure, be reliable and essentially maintenance free. It will be understood that the pumping hose 3 does not have to consist of a single continuous length, but may be put together from several segments, each containing for instance a non-return valve, so that the pumping hose easily can be made to the desired length and taken apart for repair, maintenance or cleaning.

Even though the invention has been described above with reference to special exemplifying embodiments, it will be clear to the skilled person that it may be varied and modified in a number of ways within the frame of the appended patent claims. For instance, the pumping hose 3 may be given a certain axial stiffness in order to prevent that, due to its excess length, it should get a fold or bend that would hinder flow therethrough. Such a limited axial stiffness, along with the necessary flexibility, may for instance be obtained by means of longitudinal air filled canals divided into sections and arranged at the desired water line. Another alternative is to use a corrugated hose made from a suitable plastic material. In order to facilitate cleaning of the hose after use, it may be provided with an internal lining, e.g. of film material, which may be removed and destroyed after final use.

What is claimed is:

1. A system for collecting oil on water, comprising an oil boom adapted to be towed against waves moving in the water so as to form a bight where the oil will tend to concentrate, said waves having a crest-to-crest wave length, and a floating collection container which in use of the system is located behind the boom and has an inlet at the water level which, by means of a generally tubular member, is connected to an opening in the boom at the bight thereof, characterised in that the generally tubular member comprises a floating flexible hose provided with means making flow therein substantially uni-directional from the opening to the container, and that tension members are arranged for holding the collection container at a predetermined distance from the opening in the boom to permit the flexible hose to substantially freely follow the wave motions of the water, whereby oil is transported due to the wave motion action on the hose from said opening to the container.

2. A system according to claim 1, characterised in that said uni-directional flow means are comprised by at least one non-return valve.

3. A system according to claim 2, characterised in that at least one of the tension members is connected directly to a towing vessel.

4. A system according to claim 3, characterised in that said tension member is connected to a winch on the towing vessel and runs over a pulley arranged on or near the collection container and further to a point on the boom on the opposite side of the bight of the boom with respect to the towing vessel.

5. A system according to claim 2, characterised in that the flexible tubular member is comprised substantially of a hose of fabric material and is provided with stiffening rings concurrently serving as buoyancy bodies.

6. A system according to claim 2, characterised in that the tubular flexible member has a length corresponding at least to half the wave length in which the system can function.

7. A system according to claim 2, characterised in that the length of the tension members is adjustable.

8. A system according to claim 2, characterised in that the tension members are connected to the boom at a distance from its opening.

9. A system according to claim 1, characterised in that the flexible tubular member is comprised substantially of a hose of fabric material and is provided with stiffening rings concurrently serving as buoyancy bodies.

10. A system according to claim 9, characterised in that at least one of the tension members is connected directly to a towing vessel.

11. A system according to claim 10, characterised in that said tension member is connected to a winch on the towing vessel and runs over a pulley arranged on or near the collection container and further to a point on the boom on the opposite side of the bight of the boom with respect to the towing vessel.

12. A system according to claim 9, characterised in that the tubular flexible member has a length corresponding at least to half the wave length in which the system can function.

13. A system according to claim 9, characterised in that the length of the tension members is adjustable.

14. A system according to claim 9, characterised in that the tension members are connected to the boom at a distance from its opening.

15. A system according to claim 1, characterised in that the tubular flexible member has a length corresponding at least to half the wave length in which the system can function.

16. A system according to claim 15, characterised in that the length of the tension members is adjustable.

17. A system according to claim 1, characterised in that the length of the tension members is adjustable.

18. A system according to claim 1, characterised in that the tension members are connected to the boom at a distance from its opening.

19. A system according to claim 1, characterised in that at least one of the tension members is connected directly to a towing vessel.

20. A system according to claim 19, characterised in that said tension member is connected to a winch on the towing vessel and runs over a pulley arranged on or near the collection container and further to a point on the boom on the opposite side of the bight of the boom with respect to the towing vessel.

* * * * *

UNITED STATES PATENT AND TRADEMARK OFFICE
CERTIFICATE OF CORRECTION

PATENT NO. : 6,341,920 B1
DATED : January 29, 2002
INVENTOR(S) : Asbjorn S. Bremnes It is certified that error appears in the above-identified patent and that said Letters Patent is hereby corrected as shown below:

<u>Title page,</u>
Item [22], PCT Filed: change "Dec. 11, 1999" to -- Dec. 11, 1998 --

Signed and Sealed this

Fourth Day of June, 2002

*Attest:*

*Attesting Officer*

JAMES E. ROGAN
*Director of the United States Patent and Trademark Office*